United States Patent [19]

Chwalik et al.

[11] Patent Number: 5,433,154
[45] Date of Patent: Jul. 18, 1995

[54] DETACHABLE MONORAIL CONVEYOR SYSTEM

[75] Inventors: Thomas C. Chwalik, Farmington Hills; William H. Schank, Howell, both of Mich.

[73] Assignee: Ford Motor Company, Dearborn, Mich.

[21] Appl. No.: 181,729

[22] Filed: Jan. 18, 1994

[51] Int. Cl.$^6$ ............................................... B61B 3/00
[52] U.S. Cl. ............................ 104/172.4; 104/89; 104/88.01; 104/130.04
[58] Field of Search ............... 104/27, 88 R, 96, 97, 104/89, 105, 172.4, 88.01, 170.04; 198/465.4, 680, 685, 686

[56] References Cited

U.S. PATENT DOCUMENTS

| | | | |
|---|---|---|---|
| 261,296 | 7/1882 | Berger | 198/686 |
| 299,393 | 5/1884 | Jenkins | 198/686 |
| 1,584,889 | 5/1926 | Peebles | 198/465.4 |
| 2,609,083 | 9/1952 | Leach | 198/177 |
| 2,681,015 | 6/1954 | Davis | 104/93 |
| 2,816,643 | 12/1957 | Klamp | 198/20 |
| 2,868,354 | 1/1959 | Harrison | 198/177 |
| 3,180,279 | 4/1965 | Thibault | 198/465.4 |
| 3,454,148 | 7/1969 | Harrison | 198/465.4 |
| 3,777,872 | 12/1973 | Rikman et al. | 198/477 |
| 4,098,195 | 7/1978 | Zander | 104/88 |
| 4,287,829 | 9/1981 | Wakabayashi | 104/172 |
| 4,557,373 | 12/1985 | Paurat et al. | 198/819 |
| 4,838,036 | 6/1989 | Norrie | 62/63 |
| 4,944,228 | 7/1990 | Rhodes | 104/172.3 |
| 5,000,309 | 3/1991 | Dooley | 198/680 |
| 5,069,140 | 12/1991 | Glassey | 104/28 |
| 5,303,815 | 4/1994 | Dooley | 198/680 |

Primary Examiner—Mark T. Le
Attorney, Agent, or Firm—Roger L. May; Joseph W. Malleck

[57] ABSTRACT

A detachable monorail system is provided for conveying articles between workstations wherein carriers may be disengaged and moved independently from the monorail. A carrier is provided with a load retainer, a hook, and a roller. A chain having a plurality of load bar assemblies is provided for supporting a pin extending transverse to the length of the chain. A guide track vertically adjacent the chain extends along a portion of the length of the chain. A disengagement station is defined at a location where the chain and the guide track converge vertically so that the hook disengages the load bar assembly as the roller contacts the guide track. An engagement station is defined at a location where the chain and the guide track diverge vertically so that the hook engages the load bar assembly to lift the roller off of the guide track.

18 Claims, 3 Drawing Sheets

DETACHABLE MONORAIL CONVEYOR SYSTEM

TECHNICAL FIELD

The present invention relates to conveyor systems and more particularly to a monorail conveyor system which conveys articles between workstations wherein carriers may be disengaged from the monorail and moved independently of the monorail system.

BACKGROUND OF INVENTION

Monorail conveyors are used to convey articles such as vehicles or other articles which are difficult to move from station to station. Monorail conveyors continuously move articles and do not permit articles to be stopped to perform assembly steps. As a result, assembly steps must be brief or the assembly station must allow for movement of tools or workers with the moving article.

"Power and free conveyors" have been developed in which a double track is provided for the entire length of the conveyor system with one track being used for conveying articles between stations and a second track being used to provide movement separate from the primary conveyor. The primary disadvantage of power and free conveyors is the cost of such systems. The high cost of such systems is necessitated by the complex structure of the carriers and the high cost of providing a complete double track system which extends the full length of the conveyor system. One example of a power and free conveyor is disclosed in U.S. Pat. No. 4,287,829 to Wakabayashi, which discloses a carrier stopping device adapted to either engage a trolley so that the trolley is driven by a conveyor chain or to disengage the trolley from the conveyor chain so that the trolley is permitted to move freely along the guide rail.

Another example of a conveyor system, which includes a detachable carrier is disclosed in U.S. Pat. No. 2,816,643 to Klamp. In this patent workpieces are advanced by a main conveyor and a secondary conveyor. The carriers moved by the conveyors include complex movable hooks which are lowered by cam mechanisms to engage shafts which move the carriers along the conveyors. The complex nature of the carriers disclosed in the Klamp patent makes the carriers expensive and subject to malfunction.

In general, the prior art has failed to provide a simple and effective conveyor system, which in a cost-effective manner provides a mechanism for transporting heavy articles, such as automotive bodies, between workstations where the article can be operated on and moved independently of the primary monorail system.

SUMMARY OF INVENTION

The present invention provides a detachable monorail system having a carrier member associated with a primary chain. A load retainer is supported by the carrier when a load is carried by the chain. The load retainer is secured to the carrier by means of a hook which is detachably secured to a roller disposed on a bracket of the carrier. The chain includes a plurality of links which are arranged in a lengthwise array. The chain has a plurality of load bar assemblies secured to the chain. Each load bar assembly supports a pin extending transverse to the length of the chain. A guide track is disposed vertically adjacent the chain and extends along a portion of the length of the chain. A disengagement station is defined by the chain and the guide track where they converge vertically to cause the hook to disengage the load bar assembly as the roller of the carrier contacts the guide track. An engagement station is defined by the chain and the guide track assembly where they diverge vertically wherein the hook engaging the load bar assembly lifts the roller off of the guide track.

According to the other aspects of the invention, the guide track and chain converge at the disengagement station to a point at which the load bar assembly clears a distal end of the hook allowing the chain to move independently of the carrier. Similarly, the guide track and chain diverge at the engagement station from a point at which the load bar assembly clears a distal end of the hook to a point at which the load bar assembly is engaged by the hook. The engagement of the load bar assembly by the hook allows the chain to move the carrier.

According to another aspect of the invention, a source of motive power is provided for moving a carrier along the guide track from the disengagement station to the engagement station. The source of motive power may be a hydraulic drive, a second chain drive, a robotic system or manual impetus.

According to another aspect of the invention, the primary chain moves at a substantially constant rate of speed, while the carrier moves at a different rate of speed between the disengagement station and the engagement station. The carrier initially moves faster than the chain at the engagement station to move the hook ahead of the load bar assembly and then reduces the speed at which the carrier is moved until the load bar assembly is moved by the chain to engage the hook and lift the carrier by the hook. The hook may be oriented in either a forward or rearward open position which would permit a reversal of the relative movement of the hook and the load bar assembly depending upon the orientation of the hook.

The present invention may also be characterized as a detachable monorail system comprising a monorail including a chain having a plurality of links arranged lengthwise which have a plurality of load bar assemblies secured to the chain. A carrier assembly is adapted to be detachably supported by one of the load bar assemblies for carrying a workpiece. An example of a carrier assembly would be a clam shell vehicle body support device used in automotive assembly applications. One or more rollers are preferably secured to the carrier assembly. A first guide track assembly is provided for detaching the carrier assembly from the monorail system when the roller contacts the first guide track assembly. The first guide track assembly extends from the first position adjacent the monorail to a workstation. A second guide track assembly is provided for attaching the carrier assembly onto the monorail as the roller is separated from the second guide track assembly. The second guide track assembly extends from the work station to a second position adjacent the monorail.

The carrier assembly may be further specified as including a carrier member, a load retainer supported by the carrier member and an attachment member for detachably connecting the carrier member to the load bar assembly. The attachment member is preferably a rigid coupling secured to the carrier member. For example, a simple hook may be used to connect the carrier member to the load bar assembly. The hook need not be movable relative to the carrier or shifted by any cams or power operated elements which greatly reduces the cost of the carrier assembly. Instead of providing a complex latch mechanism, the monorail and first and second guide track assemblies are set up to converge and diverge and thereby permit engagement and disengagement of the hook.

Another aspect of the present invention is provided wherein the hook is rotatably secured to and universally jointed to the carrier member. The universal joint may have a spring, a thrust bearing and a pivot bearing to allow the carrier to swing when the monorail moves around corners. In this embodiment, guide bars are provided on the carrier to keep the carrier oriented properly when the hook is unattached.

Another aspect of the invention of the detachable monorail system is provided wherein first and second monorails may be separate monorails or monorail sections having a common prime mover. A carrier assembly is detachably supported by the first monorail for carrying a workpiece. A first guide track assembly is provided for detaching the carrier assembly from the first monorail with the first guide track assembly extending from a position adjacent the first monorail to a work station. A second guide track assembly for attaching the carrier assembly onto the second monorail extends from the work station to a second position adjacent the second monorail.

The present invention may also be characterized as a monorail system having a detachable carrier assembly. A monorail is provided having a plurality of load bars movably carried thereby. Each load bar is provided with a first coupling member. A carrier assembly is adapted for carrying a workpiece and has a roller and a second coupling member. A first guide track is provided for engaging the roller and thereby decoupling the first and second coupling members and guiding the carrier assembly to a workstation. A second guide track is provided extending from the workstation to the monorail for guiding the carrier assembly to a position adjacent the monorail for recoupling the first and second coupling members.

In another aspect of the invention, the carrier assembly includes a carrier member secured to the second coupling, a load retainer supported by the carrier member and a bracket securing the roller to the carrier member.

In yet another aspect of the present invention, the first coupling member is a pin and the second coupling member is a rigid hook adapted to couple with the pin. The first guide track and the monorail may respectively converge or diverge vertically for disengagement of the load bar assembly, depending on the location of the hook. Similarly, the monorail and the second guide track may converge or diverge vertically for engagement of the load bar assembly, depending on the location of the hook.

According to another aspect of the present invention, a method of detaching a detachably supported carrier from a monorail system, transporting the carrier to a workstation and reattaching the carrier to the monorail is provided. The carrier is disengaged from the monorail by respectively converging the carrier and the monorail by a first guide track which rollingly engages a roller attached to the carrier and lifts the carrier out of its engagement with the monorail. The carrier is rollingly guided across the first guide track to a workstation. The carrier is rolled across a second guide track from the workstation to a position adjacent the monorail. The monorail then engages the carrier by respectively converging the second guide track with the monorail such that the carrier is placed in a position for attachment to the monorail and respectively diverging the second guide track and the monorail to allow the carrier to move with the monorail.

According to another aspect of the invention, a method of detaching and reattaching a carrier coupling from a conveyor is provided wherein the convergence of a first guide track and the conveyor allows the carrier to be elevated out of engagement with the conveyor and supported on the guide track independent of the conveyor. The next step in the process is the step of guiding the carrier across the first guide track to a workstation where assembly steps or other operations may be conducted on the workpiece carried by the carrier. The carrier is then guided across a second guide track to a second position adjacent the conveyor where the conveyor and second guide track converge. The carrier is then reattached to the conveyor to allow the carrier to move with the monorail system.

These and other aspects of the present invention are explained below with reference to the attached drawings. Other details and aspects of the invention will be better understood in light of the drawings and the following detailed description of the best mode of carrying out the invention.

DESCRIPTION OF THE PREFERRED EMBODIMENT

Figure 1:
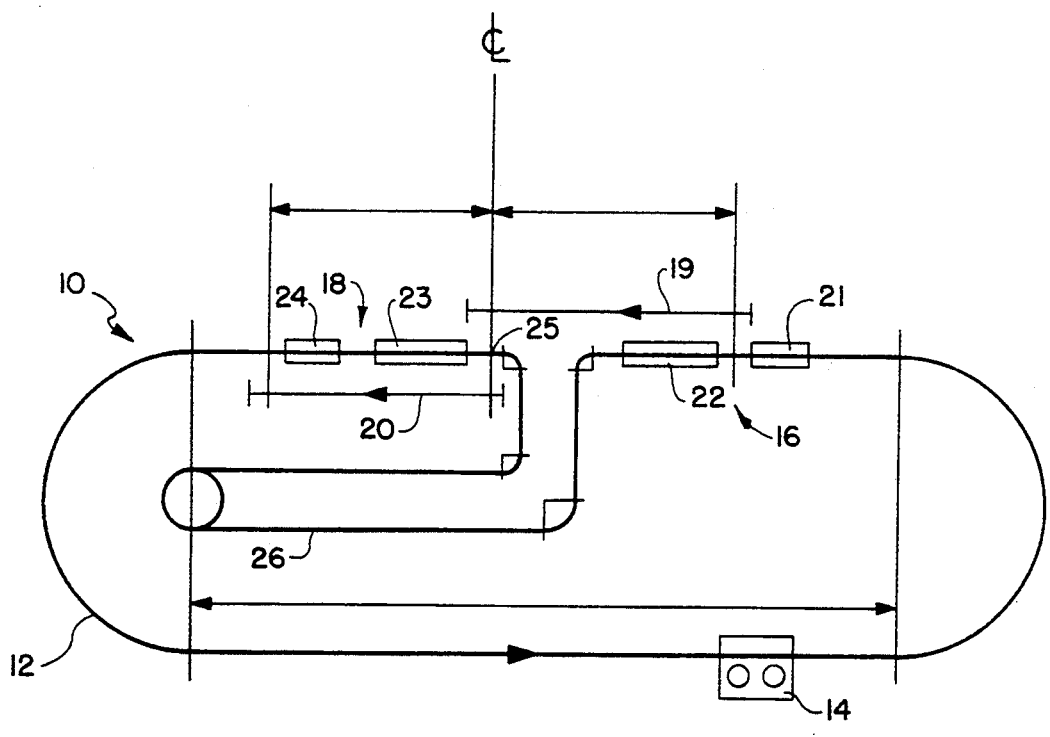
FIG. 1 is a schematic plan view of a pilot monorail system having a single workstation and incorporating the present invention.

Referring now to FIG. 1 a three rail monorail system 10 is shown diagrammatically for a pilot loop wherein only a single work station is provided. In an actual installation many work stations could be provided according to the present invention. A power rail 12 is driven by a chain drive 14. A disengagement transfer station 16 and an engagement transfer station 18 are generally referred to at two separate points on the monorail system 10. A disengagement transfer drive 19 and engagement transfer drive 20 are illustrated at spaced locations along the power rail 12. The disengagement transfer station 16 includes a convergent portion 21 and a divergent portion 22. Similarly, the engagement transfer station 18 includes a convergent portion 23 and a divergent portion 24. One or more workstations 25 are provided between the disengagement transfer station 16 and engagement transfer station 18. Also shown in FIG. 1 is a take up loop 26 which has a conventional part of a three rail monorail system 10 that controls the tension in the chain of the power rail 12.

Figure 2:
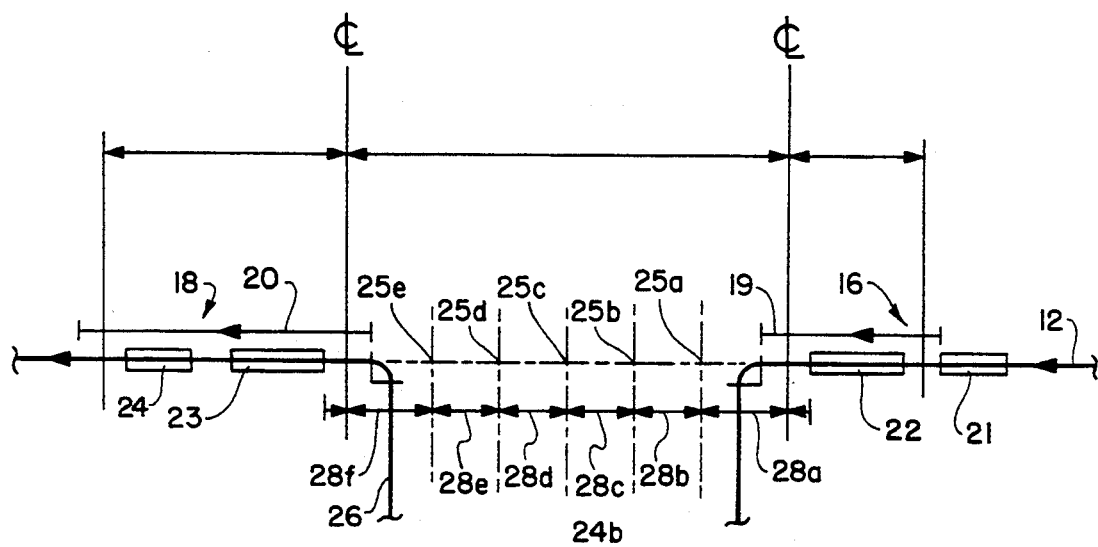
FIG. 2 is a fragmentary plan view of a series of workstations located between disengagement and engagement stations of a monorail system in accordance with the present invention.

Referring now to FIG. 2, a segment of a power rail 12 is shown in greater detail wherein disengagement transfer station 16 and engagement transfer station 18 are shown to include a disengagement drive 19 and an engagement drive 20. Convergent portion 21 and divergent portion 22 of disengagement transfer station 16 are in the lead in end of a plurality of work stations 25a-e. Between each of the work stations 25a-e, an intermediate transfer device 28a-f is provided. The take up loop 26 is again shown spanning the power rail 12 between the disengagement transfer station 16 and the engagement transfer station 18. However, it is not essential that a take up loop 26 be provided between the engagement and disengagement transfer stations 16 and 18.

Figure 3:
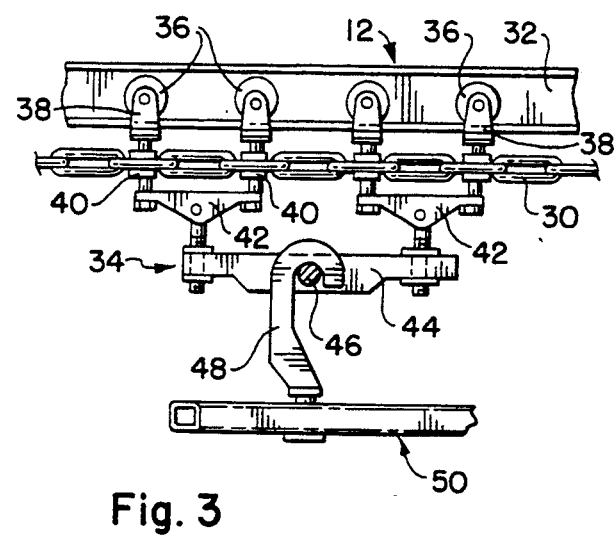
FIG. 3 is a side elevation view of a portion of the monorail system and a carrier member secured to a load bar assembly in accordance with the present invention.
Figure 4:
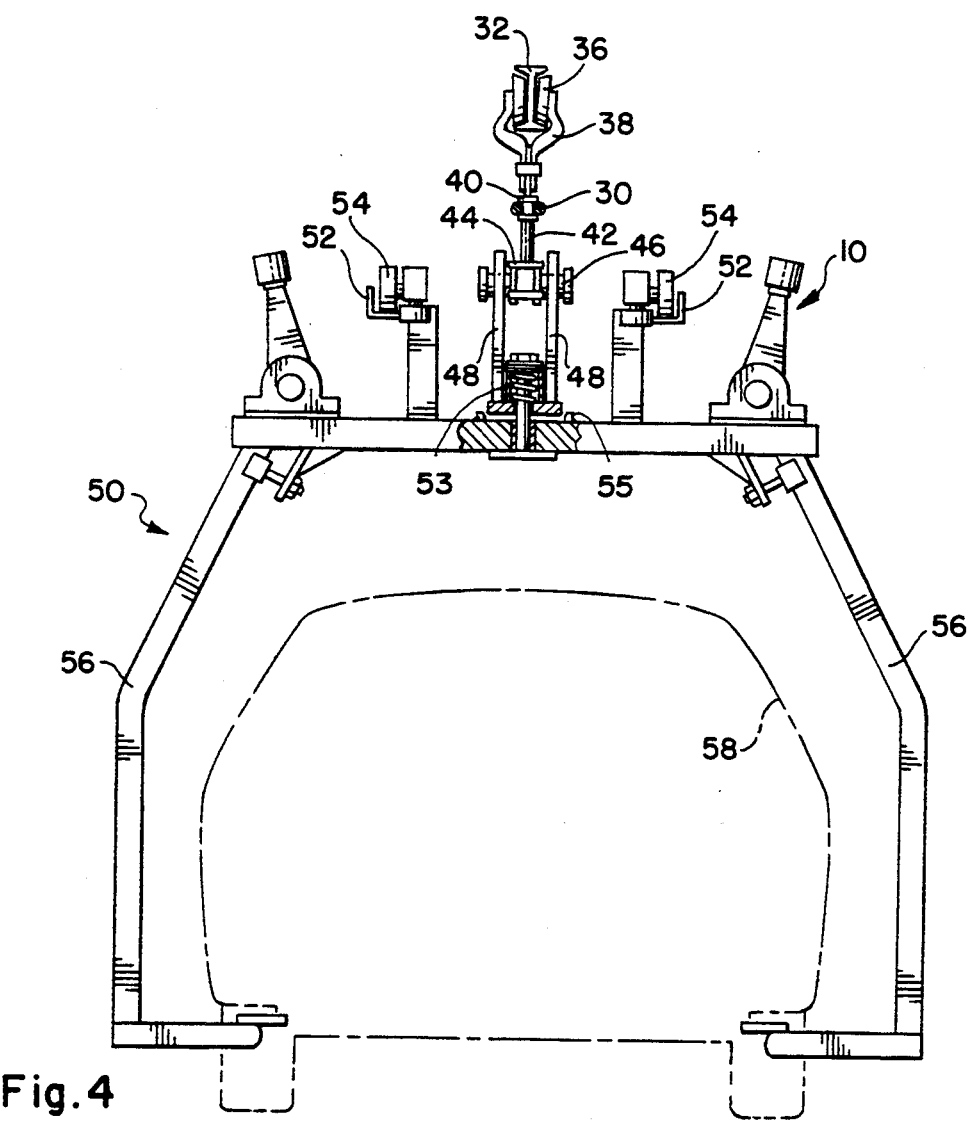
FIG. 4 is a front elevation view showing the carrier supported by the monorail system with a clam shell vehicle retainer supported by the carrier in accordance with the present invention.

Referring now to FIGS. 3 and 4, a chain 30 is made up of chain links interconnected in a lengthwise manner and functions to move objects along a beam 32. The chain 30 and beam 32 are part of the power rail 12 of the three rail monorail system 10. A load bar assembly 34 is generally indicated. A plurality of trolleys 36 are held by brackets 38 in engagement with the beam 32. A connector 40, otherwise known as a "B" attachment, is provided to connect the brackets 38 to the chain 30. A T-bracket 42 preferably interconnects two connectors 40. A load bar support 44 interconnects two T-brackets 42 and provides a stable support for load pin 46. A hook 48 engages the load pin 46 which in turn supports a carrier generally indicated by reference numeral 50. The spring 53 allows the carrier 50 to swing when the power rail 12 curves. When the hook 48 is engaged with the load pin 46, the spring 53 compresses, and the hook 48 clears the guide bars 55 so that the carrier 50 may rotate.

The structure of the three rail monorail system 10 is shown in conjunction with a complete carrier 50. The three rail monorail system 10 includes support rails 52 on opposite lateral sides of power rail 12. Rollers 54 engage the support rails 52 when the carrier 50 is driven by the power rail 12. Clam shell arms 56 extend downwardly to engage a vehicle body 58 shown in phantom lines between the opposed clam shell arms 56. As previously described in reference to FIG. 3, the chain 30 is connected by connectors 40 to the bracket 38 for trolleys 36 which ride along the beam 32 of the power rail 12. T bracket 42 interconnects the connectors 40 and the load pin support 44 holds the load bar 46 so that it may be engaged and disengaged by hook 48 as the carrier 50 is moved by the power rail 12. Hook 48 disengages the load pin 46 at the disengagement transfer station 16. Hook 48 re-engages the load pin 46 at the engagement transfer station 18. The guide bars 55 keep the carrier 50 oriented in a proper direction when the hook 48 is disengaged from the load pin 46.

Figure 5:
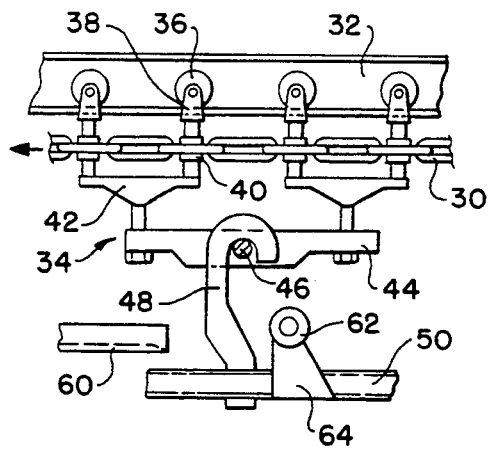
FIG. 5 is a side elevation view showing the carrier supported by the load bar assembly and monorail system.
Figure 6:
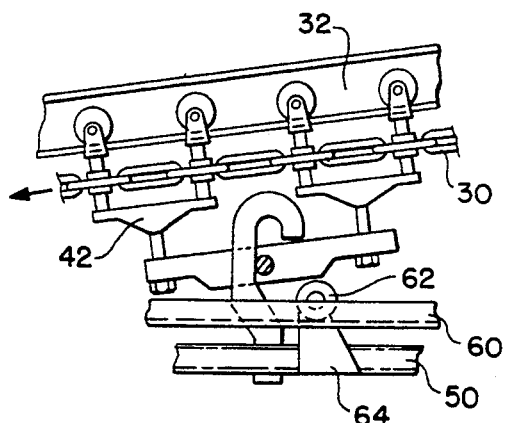
FIG. 6 is a side elevation view showing the hook releasing the load bar assembly after a roller on the carrier engages a guide track.
Figure 7:
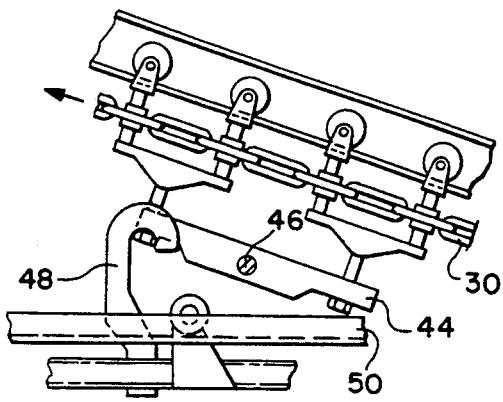
FIG. 7 is a side elevation view showing the carrier supported by the guide track and the load bar assembly moving clear of the carrier hook.

Referring now to FIGS. 5–7, operation of the invention at the disengagement transfer station 16 will be described sequentially. In FIG. 5 the carrier 50 is supported by the hook 48 on the load bar 46. Load pin 46 is carried by load bar support 44 which is in turn supported by two T-brackets 42. Each of the T-brackets 42 are supported by two connectors 40 to the chain 30 and the brackets 38 and rollers 36. Trolleys 36 ride along the beam 32. As the chain moves the load bar assembly 34 and carrier 50 from right to left, the rollers 62 approach transfer support rails 60.

Referring now to FIG. 6, transfer rollers 62 engage the transfer support rails 60 while the beam 32 converges toward the transfer support rails 60. Transfer rollers 62 are supported by roller bracket 64 on the carrier 50.

Referring now to FIG. 7, the carrier 50 is shown supported entirely by the transfer support rails 60 with the hook 48 completely separated from the load pin 46. At this point the carrier is propelled at a greater rate of speed by the disengagement transfer drive 19 than the speed at which the chain 30 moves.

Figure 8:
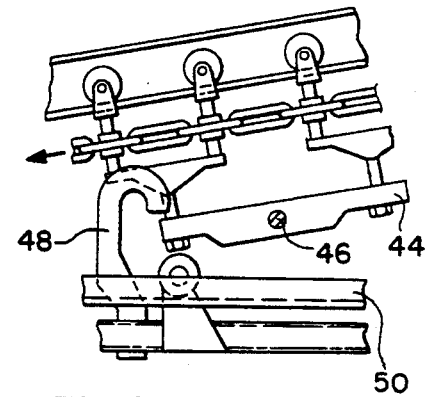
FIG. 8 is a side elevation view showing the carrier supported by the guide track and awaiting pick up by the load bar assembly.

Referring now to FIG. 8, the interaction of the carrier 50 and hook 48 relative to the load bar support 44 and load pin 46 will be described at the engagement transfer station 18. The engagement transfer drive 20 moves the hook 48 to a position in front of the load pin 46 which is approaching the hook 48 as it moves from right to left as viewed in FIG. 8. The load pin 46 moves in the convergent portion 23 of the engagement transfer station 18 to a point below the distal end of the hook 48.

Figure 9:
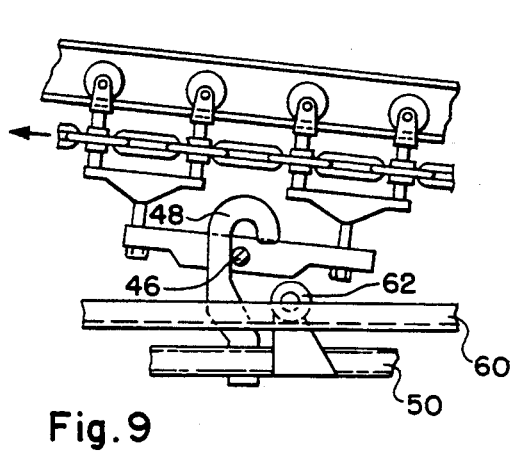
FIG. 9 is a side elevation view showing the carrier supported by the guide track with the load bar assembly beginning to engage the carrier hook.
Figure 10:
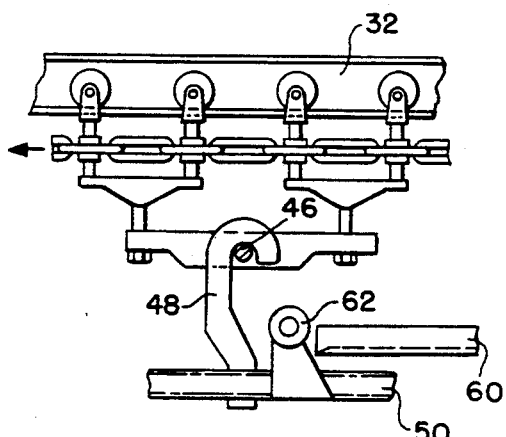
FIG. 10 is a side elevation view showing the carrier supported by the load bar assembly and monorail system after disengagement from the guide track.

Referring now to FIG. 9, the load pin 46 engages the hook 48 below the distal end of the hook 48. The load pin 46 engages the hook 48 so that the hook 48 and load pin 46 are moved at the same rate of speed. At this time the roller 62 is still riding on the transfer support rails 60. As the carrier 50 moves into the divergent portion 24 of the engagement transfer station 18, the load pin 46 rides up the inside surface of the hook 48 until it reaches the upper end of the inside surface of the hook 48 whereupon it is in full engagement and ready to completely support the weight of the carrier on the monorail system 10. At this point the hook 48 and load pin 46 are in complete engagement and the carrier 50 is supported solely by the monorail system independently of the transfer support rail 60.

It will be readily understood that the power rail 12 could be of uniform height with the convergence and divergence of the power rail 12 relative to the transfer support rails 60 being accomplished by making the transfer support rails 60 change height to accomplish the convergence and divergence. It will also be readily understood that the power rail 12 and transfer support rails 60 could be respectively converged or diverged simultaneously to accomplish convergence or divergence.

Various drive mechanisms can be used as the disengagement transfer drive 19 and engagement transfer drive 20. For example, a second chain, hydraulic cylinder, electrically driven rack and pinion or worm gear or a robot actuator could be used to move the carrier 50 along the transfer support rails 60. It is also conceivable that the workpiece could be completely removed from the transfer support rails 60. Other methods of moving the carrier 50 along the transfer support rails 60 would include a gravity slide mechanism or pneumatic device such as a kicker.

While the best mode for carrying out the invention has been described in detail, those familiar with the art to which this invention relates will recognize various alternative designs and embodiments for practicing the invention as defined in the following claims.

We claim:

1. A detachable monorail system comprising:
    a carrier;
    a load retainer supported by the carrier;
    a hook rigidly secured relative to the carrier with an opening oriented in one longitudinally aligned direction;
    a roller secured by a bracket to the carrier;
    a chain including a plurality of links arranged lengthwise, the chain having a plurality of load bar assemblies secured to the chain, each of the load bar assemblies supporting a pin extending transverse to the length of the chain;
    a drive operatively engaging the chain;
    a guide track vertically adjacent the chain and extending along a portion of the length of the chain;
    means for driving the carrier on the guide track in said one longitudinally aligned direction;
    a disengagement station being defined by the chain and the guide track converging vertically, the hook disengaging the load bar assembly as the roller contacts the guide track and the load bar is moved by the chain through the opening in the hook; and
    an engagement station being defined by the chain and the guide track diverging vertically, the hook engaging the load bar assembly to lift the roller off of the guide track, said load bar being moved by the chain through the opening in the hook.

2. The detachable monorail system of claim 1 wherein the guide track and chain converge at the disengagement station to a point at which the load bar assembly clears a distal end of the hook allowing the chain to move independently of the carrier.

3. The detachable monorail system of claim 1 wherein the guide track and chain diverge at the engagement station from a point at which the load bar assembly clears a distal end of the hook to a point at which the load bar assembly is engaged by the hook allowing the chain to move the carrier.

4. The detachable monorail system of claim 1 wherein a source of motive power is provided for moving the carrier along the guide track from the disengagement station to the engagement station.

5. The detachable monorail system of claim 4 wherein the source of motive power is a hydraulic drive.

6. The detachable monorail system of claim 4 wherein the source of motive power is a second chain drive.

7. The detachable monorail system of claim 4 wherein the source of motive power is a robotic system.

8. The detachable monorail system of claim 4 wherein the source of motive power is manual impetus.

9. The detachable monorail system of claim 1 further comprising means for controlling relative movement of the chain and carrier, wherein the chain moves at a substantially constant rate of speed and the carrier moves at a different rates of speed between the disengagement station and the engagement station, the carrier initially moving faster than the chain at the engagement station to move the hook ahead of the load bar assembly and then reducing the speed at which the carrier is moved until the load bar assembly is moved by the chain to engage the hook and lift the carrier by the hook.

10. The detachable monorail system of claim 1 further comprising means for decelerating the carrier, wherein the carrier slows down upon contacting the disengagement station and the chain continues to move wherein the hook disengages the load bar assembly.

11. A monorail system having a detachable carrier assembly and comprising:
    a monorail having a plurality of load bars movably carried thereby, each load bar having a first coupling member;
    a carrier assembly adapted for carrying a workpiece and having a roller and a second coupling member;
    a first guide track portion adjacent the monorail, the first guide track including means for selectively engaging the roller for decoupling the first and second coupling members when the roller engages the first guide track, the first guide track extending from a first position adjacent the monorail for engagement by the roller to a workstation; and
    a second guide track extending from the workstation to a second position adjacent the monorail, the second guide track including means for disengaging the roller from the second guide track at the second position and for recoupling the first and second coupling members.

12. The monorail system of claim 11 wherein the detachable carrier assembly comprises:
    a carrier member secured to the second coupling member;
    a load retainer supported by the carrier member; and
    a bracket securing the roller to the carrier member.

13. The monorail system of claim 12 wherein the first coupling member is a pin and the second coupling member is a rigid hook adapted to couple with the first coupling member.

14. The monorail system of claim 13 wherein the first guide track and the monorail respectively converge vertically, the hook disengaging the load bar assembly at the first position adjacent the monorail.

15. The monorail system of claim 13 wherein the first guide track and the monorail respectively diverge vertically, the hook disengaging the load bar assembly at the first position adjacent the monorail.

16. The monorail system of claim 13 wherein the second guide track and the monorail respectively diverge vertically, the hook engaging the load bar assembly to lift the roller off of the second guide track assembly at the second position adjacent the monorail.

17. The monorail system of claim 13 wherein the second guide track and the monorail respectively converge vertically, the hook engaging the load bar assembly to lift the roller off of the second guide track assembly at the second position adjacent the monorail.

18. A method of detaching and reattaching a carrier coupling from a conveyor for facilitating the removal of the carrier from the conveyor to a workstation and for return of the carrier to the conveyor, the method comprising the steps of:
    elevating the coupling relative to the conveyor to detach the carrier from the conveyor;
    initially moving the carrier away from the conveyor to a workstation after detaching the coupling from the conveyor;

subsequently moving the carrier from a workstation toward the conveyor;

lowering the coupling relative to the conveyor to reattach the carrier to the conveyor; and wherein during one of said moving steps the carrier is propelled at a greater rate of speed than the conveyor to place the carrier forward of the conveyor relative to the direction of movement of the conveyor.

* * * * *